(12) United States Patent
Muttik

(10) Patent No.: US 9,462,471 B2
(45) Date of Patent: Oct. 4, 2016

(54) IDENTIFICATION OF CALL PARTICIPANTS

(71) Applicant: McAfee, Inc., Santa Clara, CA (US)

(72) Inventor: Igor Muttik, Berkhamsted (GB)

(73) Assignee: McAfee, Inc., Santa Clara, CA (US)

( * ) Notice: Subject to any disclaimer, the term of this patent is extended or adjusted under 35 U.S.C. 154(b) by 69 days.

(21) Appl. No.: 14/317,929

(22) Filed: Jun. 27, 2014

(65) Prior Publication Data

US 2015/0382191 A1 Dec. 31, 2015

(51) Int. Cl.
*H04M 1/66* (2006.01)
*H04W 12/06* (2009.01)
*H04L 29/06* (2006.01)

(52) U.S. Cl.
CPC ............ *H04W 12/06* (2013.01); *H04L 63/083* (2013.01); *H04L 63/0861* (2013.01); *H04L 2463/082* (2013.01)

(58) Field of Classification Search
CPC ............ H04W 12/06; H04L 63/0861; H04L 63/083; H04L 2463/082
USPC ........ 455/411; 380/241, 252, 253, 255, 275, 380/278, 283; 382/100; 713/168, 171, 172, 713/182; 726/20
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,173,400 B1 * | 1/2001 | Perlman | G06F 21/34 380/255 |
| 6,460,050 B1 | 10/2002 | Pace et al. | |
| 7,506,155 B1 | 3/2009 | Stewart et al. | |
| 7,961,881 B2 * | 6/2011 | Jensen | H04H 20/31 380/241 |
| 2004/0210928 A1 | 10/2004 | Hamzy et al. | |
| 2008/0181140 A1 | 7/2008 | Bangor et al. | |
| 2009/0219437 A1 | 9/2009 | Baugher et al. | |
| 2010/0284310 A1 | 11/2010 | Shaffer et al. | |
| 2011/0150200 A1 | 6/2011 | Uhler et al. | |
| 2013/0301869 A1 * | 11/2013 | Seo | G06T 1/0021 382/100 |

FOREIGN PATENT DOCUMENTS

| | | |
|---|---|---|
| CN | 101938489 B * | 9/2012 |
| WO | 2015/199904 | 12/2015 |

OTHER PUBLICATIONS

PCT ISR and WO for PCT/US2015/033428 mailed Aug. 25, 2015; 12 pages.

* cited by examiner

*Primary Examiner* — Amancio Gonzalez
(74) *Attorney, Agent, or Firm* — Patent Capital Group

(57) ABSTRACT

In an example, an audio stream such as a voice call or live-streaming service may have mixed therein a user identification, which may identify the user as an authorized participant in the audio stream. For example, a user may identify himself to a smart phone, and then initiate a call with his bank. The smart phone may mix a user identification into the voice stream. A receiving device at the bank may demix the identification, and determine that the user is authorized to call about this account. In another example, identification may be used for DRM purposes, to identify a user as a legitimate participant in an audio stream. When a user is not authorized, an appropriate action may be taken, such as dropping the user, degrading the quality of the audio stream, or providing a notification that the user is not authorized.

24 Claims, 6 Drawing Sheets

IDENTIFICATION OF CALL PARTICIPANTS

FIELD OF THE DISCLOSURE

This application relates to the field of network security, and more particularly to a system and method for identification of call participants.

BACKGROUND

A fundamental security issue is confidently identifying one user or device to another user or device. In one example, a first device sends to a second device one or more credentials, and the second device identifies the first device as suitable for granting access to restricted resources.

In some cases, a two-factor identification protocol may be provided, such as where additional security is desirable. For example, a smart phone may create a two-channel connection to a server or other similar device. On the first channel, the smart phone provides data or voice to carry out the purpose of the connection. On the second channel, the smartphone transmits credential information. This allows the server to determine with some level of confidence that the device is authorized to use certain resources.

BRIEF DESCRIPTION OF THE DRAWINGS

The present disclosure is best understood from the following detailed description when read with the accompanying FIGURES. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Embodiments of the Disclosure

Figure 1:
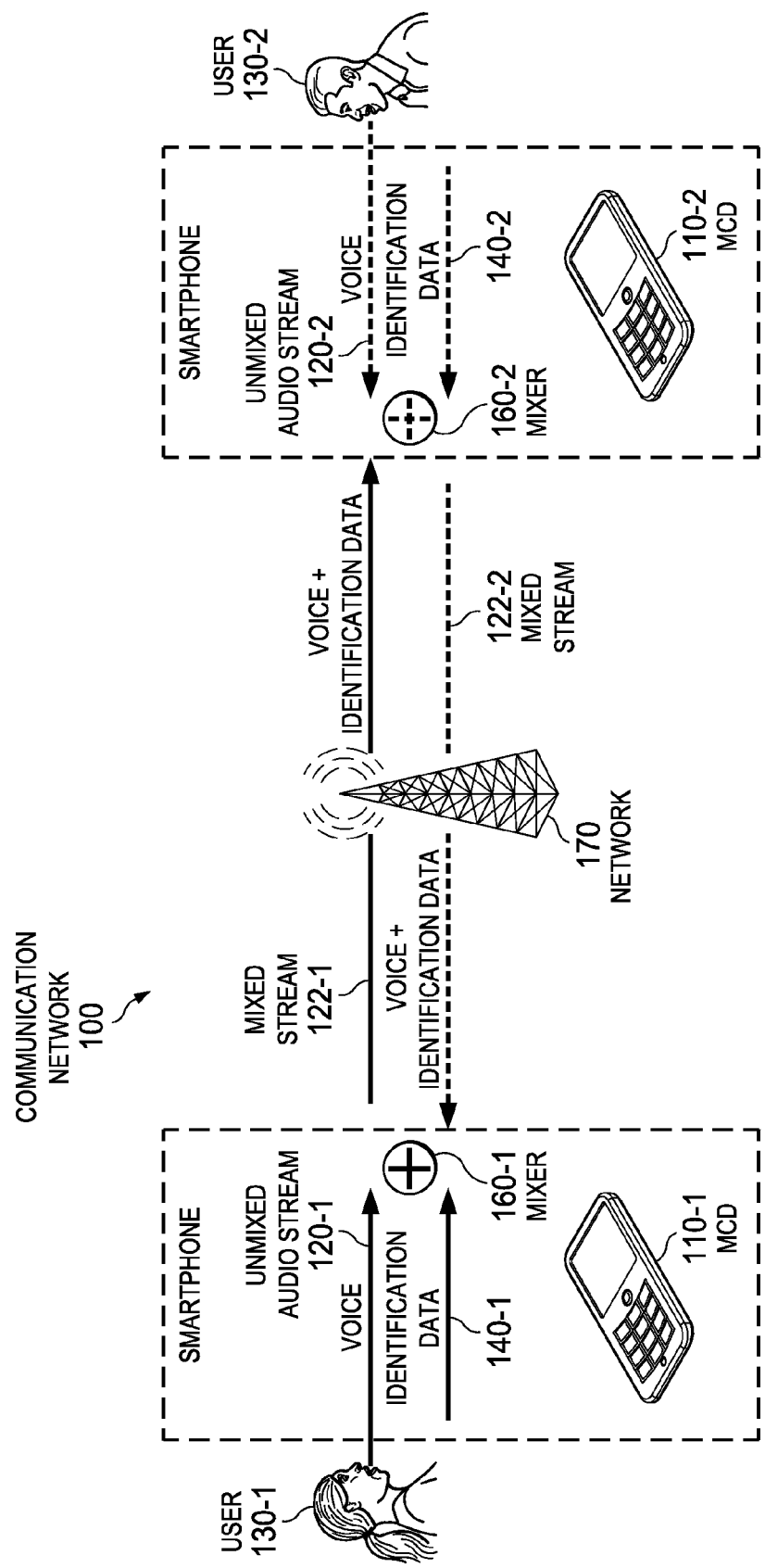
FIG. 1 is a network diagram according to one or more examples of the present Specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments many have different advantages, and no particular advantage is necessarily required of any embodiment.

In an example of the system and method of the present Specification, a user operating a mobile communication device, such as a smartphone, may initiate a call to a second device. The second device may be a smart phone, a landline, a server, or some combination of devices. In one example, the second device is operated by a banking or financial institution. The user has an account at the bank, and would like to take some action, such as transferring funds, authorizing a withdrawal, checking his balance, resetting a password, or pre-clearing a large purchase. When the user calls the bank, the bank has an interest in confidently identifying the user and ensuring that he is authorized to conduct business as the owner of the account in question. In one method, the bank and the user exchange a pre-shared secret, such as a phone-specific password that the user established when setting up his account. When the user calls the bank, an operator asks the user for his phone-specific password. When the user gives the password, the user is considered authorized, and may then conduct his business.

There are, however, some difficulties with this method. For example, if user forgets his password, additional actions may be necessary to verify his identity, and the bank is at greater risk of a social engineering-type attack, where for example a malicious attacker has gathered a certain amount of information about the user, but does not know his password. In that case, the malicious attacker may be able to successfully impersonate the caller, and gain access to restricted resources. This kind of attack becomes increasingly more probable as institutions become larger and less personal, and the amount of information about a person available through online searches and other resources in a data-intensive society increases. Thus, it is advantageous, according to the system and method of the present Specification, to provide an identification scheme that is more robust and less prone to human error. Additionally, in this scenario the user cannot be sure that he reveals the secret to a trusted part, especially if that external caller initiated the phone connection. It is desirable for optimum security to provide assurance about the other party to all participants of the call (in our specific example—to both the bank and the user).

Advantageously, many modern communication devices, such as smartphones and tablets, include processing power that can be leveraged for operating an identification scheme. In one example, the user is operating a mobile telephone to call the bank. Before placing the call, the user identifies himself to his smartphone. For example, the user may be required to enter a username and password combination, a PIN, or to provide other credentials to access the smartphone. In another example, the user has a smart phone that has embedded software (like the operating system or a userspace app provided by the bank), which requires the user to provide credentials, such as biometric identification, entering a pre-shared key, providing a valid RSA certificate, or possessing an RFID token. It will be appreciated that many identification schemes and their combinations are compatible with the teachings of the present Specification, and it is intended that the teachings of the present Specification encompass all such suitable identification schemes.

The level of identification required may depend on the context. For example, to merely verify that a check has cleared, a lesser level of identification confidence may be required. To authorize or initiate a large financial transaction, a higher level of confidence in the identification may be required. Once the user has satisfactorily identified himself to the smartphone, the smartphone may initiate a call to the banking institution. Advantageously, this call may be initiated with a single audio channel such as a voice channel, so that the user is able to securely conduct business even when he does not have a data network connection available (for example GPRS, LTE, 3G, 4G or WiFi connections typical in smart phones). This is valuable because in many cases, a smartphone may not be equipped with a wireless data connection, or the data connection may be disabled (turned off by the user or programmatically via software) or the user may be in an area where coverage is sufficient only for voice channels, and not sufficient for providing data channels.

After establishing an audio channel with the bank, the smartphone modulates the identification data onto the audio channel. This may be provided in an audio band that is inaudible to users, so that the user's call experience is not interrupted or interfered with. The data channel superimposed on the audio channel may provide either or both of identification of the device itself and an identification of the user operating the device. Depending on the context, one or both of these may be necessary for authorizing the call so that the user and device can continue participating in the audio stream or be granted access to certain resources. Once the bank is satisfied that the user is authentic, he is permitted to transact business. This authorization need not be a computer-enforced policy. Rather, because the user has been reliably identified, either a computer or a human user may decide how to handle the transaction. Thus, the term "authorization," as used throughout this Specification, does not necessarily imply an "all-or-nothing" approach. Rather, it may imply a multi-faceted and nuanced process, wherein a device authorizing a user may include using algorithms, heuristics, a digital reputation, or even explicit user input to allow access to any individual resource.

On the other hand, if the bank determines that the user is not authentic, or that his authenticity is questionable, the bank may take appropriate action, such as dropping the call, notifying operator that he is suspect, notifying authorities, or otherwise acting appropriately to deal with the situation.

In another example, a similar architecture may be used for digital rights management (DRM). In a DRM scheme, a two-way audio or video channel may be established between a user device and a server. The user and device may be identified to the server over the audio stream. Once the authorization is complete, the server may provide the desired media, such as a song, ringtone, or video. If authorization fails or is questionable, appropriate action may be taken such as dropping the connection, degrading the quality of the media, lossily compressing the media, or providing an alternative (modified original or entirely different) media stream.

Practitioners in the art will recognize that many other applications of the identification and authorization protocols of the present Specification are possible. For example, the same approach would work with more than two call participants.

FIG. 1 is a network level diagram of a communication network 100 according to one or more examples of the present Specification. In an example, user 130-1 operates a mobile communication device (MCD) 110-1. In this context, user 130-1 may be any individual, entity, group, organization, enterprise, or device attempting to use a network 170 to conduct a transaction. It should also be noted that a single user 130-1 is shown operating a single device 110-1 by way of example only. In the case of a conference call or similar setup, a plurality of users 130 and/or MCDs 110 may connect at once.

MCD 110-1 may be any suitable communication device. It should also be noted that the designation of MCD 110-1 as "mobile" is by way of example only. In certain embodiments, MCD 110-1 could be, for example, a landline or other communication medium. Furthermore, MCD 110-1 need not necessarily be a phone. Those with skill in the art will recognize that many species of communication devices are useful for practicing the teachings of this Specification, and that the appended claims are applicable to any such communication device.

In an example, user 130-1 identifies himself to MCD 110-1 according to methods disclosed in the Specification. Based on the identification, MCD 110-1 creates identification data 140-1. Identification data may be any suitable data that identifies user 130-1. That data can be sent as a packet or in any other form (such as streamed or in a steganographic fashion).

Upon initiating a call, MCD 110-1 establishes unmixed audio stream 120-1. This may include, for example, voice data or other audio data. In appropriate contexts, an audio stream 120 may also include video data or other multimedia data accompanying audio data. MCD 110-1 uses mixer 160-1 to mix identification data 140-1 with unmixed audio stream 120-1. This may comprise, in certain examples, using frequency modulation or amplitude modulation (or a combination) to mix identification data 140-1 with a carrier signal, which is then imposed on unmixed audio stream 120-1. MCD 110-1 thereby creates mixed stream 122-1.

MCD 110-1 transmits mixed stream 122-1 over network 170. A "network," as used throughout this Specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, wired network (analog or digital), any other appropriate architecture or system that facilitates communications in a network or telephonic environment, or any suitable combination thereof.

On the other end of the communication, a second MCD 110-2 is operated by a second user 130-2. The examples and illustrations of MCD 110-1 and user 130-1 are equally applicable to MCD 110-2 and user 130-2.

In an example, user 130-2 has an interest in confidently identifying user 130-1 as an authorized participant in mixed stream 122-1. Thus, MCD 110-2 is operable to receive mixed stream 122-1 and to demix mixed stream 122-1 in mixer 160-2. MCD 110-2 may then extract identification data 140-1. MCD 110-2 may compare identification data 140-1 to a security tokens stored, for example, on MCD 110-2, or on a remote server. In some cases, authorization may be a Boolean operation: either user 130-1 is authorized or he is not. In other cases, authorization may be a matter of degrees. For example, user 130-1 may be authorized for certain levels of access to perform certain operations. In other cases, a heuristic algorithm may be used to predict the reliability of user 130-1. In yet other cases, user 130-1 may be provisionally authorized, and user 130-1 may receive from MCD 110-2 a notification that his identity has not been reliably established. In one embodiment the authorization may be delayed until after the connection is established between the parties.

If user 130-1 is not fully authorized, user 130-2 and/or MCD 110-2 may take other actions to further authorize user 130-1. In one example, if user 130-1 attempts and fails to satisfactorily identify himself as authorized to MCD 110-2, MCD 110-2 may have a security protocol, such as maintaining the connection and providing only a false transaction with user 130-1. In this scenario, user 130-2 and MCD 110-2 may lead user 130-1 to believe that the transaction has been carried out as requested, but may not actually carry out the transaction, and may instead alert authorities. It will be appreciated that many other scenarios are possible.

Once user 130-2 identifies himself to MCD 110-2, MCD 110-2 may generate identification data 140-2. MCD 110-2 may then mix identification data 140-2 with voice data 120-2, to create mixed stream 122-2. In that case, user 130-1 and MCP 110-1 may have a similar or a different protocol for dealing with whether user 130-2 is properly, fully, or not-at-all authorized.

It will be appreciated that this network architecture is disclosed by way of example only, and that many configurations are possible without departing from the spirit and scope of this Specification. By way of example, there may be multiple users 130-1, 130-2, . . . 130-N, connecting to an automatic teleconference provider that will authorize the participants.

Figure 2:
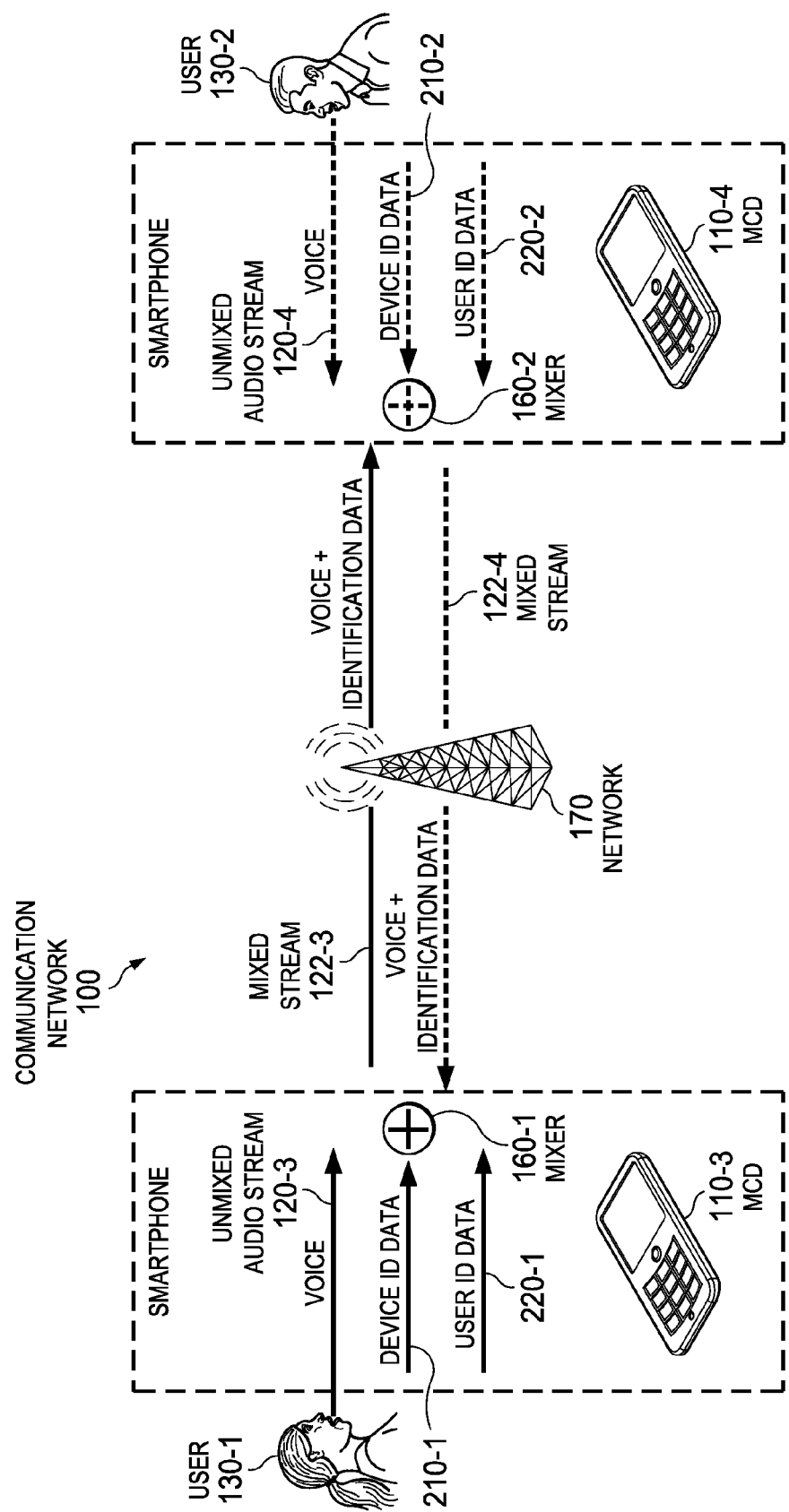
FIG. 2 is a network diagram according to one or more examples of the present Specification.

FIG. 2 is a network level diagram of a multi-tiered identification and authorization scheme according to one or more examples of the present Specification. It is recognized that in certain cases it is desirable to identify not only user 130-1, but also MCD 110-1 itself. For example, user 130-1 may be granted various levels of access to resources by user 130-2 based on which MCD 110 user 130-1 is operating. In this case, user 130-1 may have in his possession a plurality of MCD's 110. For example, user 130-2 may be an enterprise that is an employer of user 130-1. In that case, if MCD 110 is an enterprise-issued device, then user 130-1 may be granted substantially full access to resources of user 130-2. However, if MCD 110 is a personal device, user 130-1 may be granted lesser access to resources of enterprise 130-2. Thus, it is desirable to know that user 130-1 is operating MCD 110-3, and to fully identify and/or authorize both. In that case, MCD 110-1 generates both device ID data 210-1 and user ID data 220-1. These are mixed in mixer 160-1 with unmixed audio stream 120-3 to create mixed stream 122-3. In an alternative embodiment user 130-1 is not required and ID data 210-1 may be used to establish trust between the parties.

MCD 110-4 may receive mixed stream 122-3 and user 130-2 may grant user 130-1 access to resources based on the identification. The same access control functionality may be enforced automatically without involving user 130-2.

In some cases, it is desirable for symmetrical identification and authorization to take place. This helps user 130-1 to be sure that user 130-2 is really who he or it claims to be. Thus, MCD 110-4 may also generate user ID data 220-2 and device ID data 210-2. These may be mixed with unmixed audio stream 120-4 via mixer 160-2. These are provided via mixed stream 122-4 to MCD 110-3. LCD 110-3 and user 130-1 and/or MCD 110-1 may then make decisions about how much to trust user 130-2 based on the identification. There may be more than two parties on a call but for the clarity of the drawing, only one is shown in this example.

Figure 3:
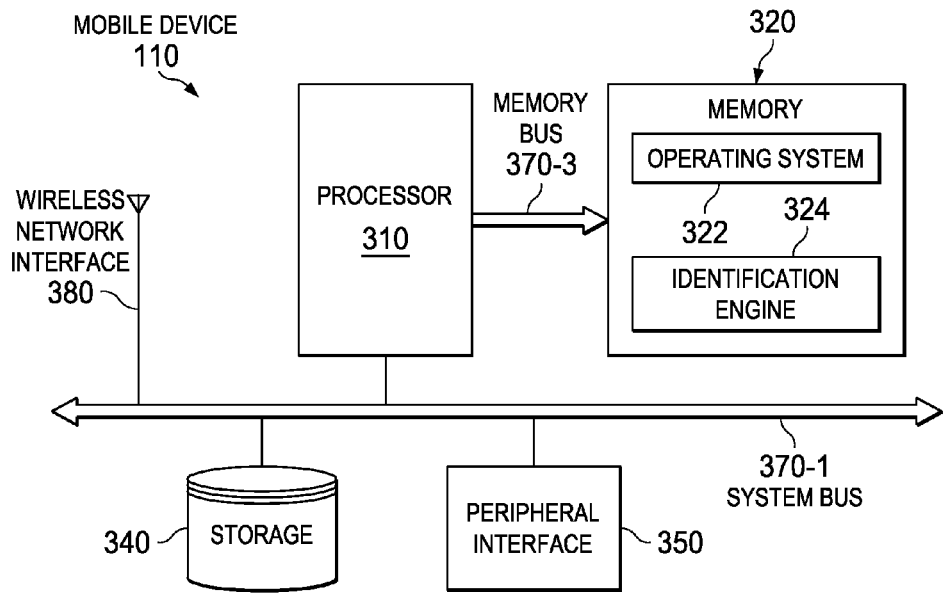
FIG. 3 is a block diagram of a mobile communication device according to one or more examples of the present Specification.

FIG. 3 is a block diagram of mobile communication device 110 according to one or more examples of the present Specification. In various embodiments, a "mobile communication device" (MCD) may be or comprise, by way of non-limiting example, a computer, server, virtual computer, embedded computer, embedded controller, embedded sensor, personal digital assistant (PDA), laptop computer, cellular telephone, IP telephone, smart phone, tablet computer, convertible tablet computer, handheld calculator, or any other electronic, microelectronic, or microelectromechanical device for processing and communicating data.

MCD 110 includes a processor 310 connected to a memory 320, having stored therein executable instructions for providing an operating system 322 and identification engine 324. Other components of MCD 110 include a storage 340, wireless network interface 380, and peripheral interface 350.

In an example, processor 310 is communicatively coupled to memory 320 via memory bus 370-3, which may be for example a direct memory access (DMA) bus. Processor 310 may be communicatively coupled to other devices via a system bus 370-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of hardware, software, or firmware providing programmable logic, including by way of non-limiting example a microprocessor, digital signal processor, field-programmable gate array, programmable logic array, application-specific integrated circuit, or virtual machine processor.

Processor 310 may be connected to memory 320 in a DMA configuration via DMA bus 370-3. To simplify this disclosure, memory 320 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 320 may comprise a relatively low-latency volatile main memory, while storage 340 may comprise a relatively higher-latency non-volatile memory. However, memory 320 and storage 340 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 340 may be any species of memory 320, or may be a separate device, such as a hard drive, solid-state drive, external storage, redundant array of independent disks (RAID), network-attached storage, optical storage, tape drive, backup system, cloud storage, or any combination of the foregoing. Storage 340 may be, or may include therein, a database or databases or data stored in other configurations, and may include a stored copy of operational software such as an operating system and a copy of operating system 322 and software portions of identification engine 324. Many other configurations are also possible, and are intended to be encompassed within the broad scope of this Specification.

Network interface 380 may be provided to communicatively couple mobile communication device 110 to a wired or wireless network, such as network 170. Network interface 380 is referred to herein as a "wireless network interface" by way of example, to illustrate the utility of the teachings of the present Specification in a wireless communication environment. But it should be appreciated that non-wireless networks may also be used at appropriate times. In one example, network interface 380, along with any supplemental hardware necessary (including in some embodiments peripherals connected via peripheral interface 350) or any necessary software running in memory 320 or stored on storage 340, form an audio telecommunication driver, which may be used for wireless telecommunication services.

Identification engine 324, in one example, is a utility or program that carries out a method, such as one or more of methods 500, 600, 700, or 800 of FIGS. 5, 6, 7, and 8 respectively, or other methods according to this Specification. Identification engine 324 may be, in various embodiments, embodied in hardware, software, firmware, or some combination thereof. For example, in some cases, identification engine 324 may include a special integrated circuit designed to carry out a method, and may also include software instructions operable to instruct a processor to perform the method. It should also be noted that identification engine 324 is provided by way of non-limiting example only, and that other hardware and software, including interactive or user-mode software, may also be provided in conjunction with, in addition to, or instead of identification engine 324 to perform methods according to this Specification.

In one example, identification engine 324 includes executable instructions stored on a non-transitory medium operable to perform all or part of one or more of methods 500, 600, 700, and 800, or a similar method according to this Specification. At an appropriate time, such as upon booting mobile communication device 110 or upon a command from the operating system or a user, processor 310 may retrieve a copy of identification engine 324 (or software portions thereof) from storage 350 and load it into memory 320. Processor 310 may then iteratively execute the instructions of identification engine 324.

Peripheral interface 350 may be configured to communicatively couple processor 310 to any auxiliary device that connects to mobile communication device 110 but that is not necessarily a part of the core architecture of mobile communication device 110. A "peripheral," as used throughout this Specification, may be operable to provide extended functionality to mobile communication device 110, and may or may not be wholly dependent on mobile communication device 110. In some cases, a peripheral may be a computing device in its own right. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example. More specifically, peripheral interface 350 may communicatively couple identification or authorization devices to processor 310. These may include, by way of non-limiting example, biometric identifiers such as fingerprint scanners, retinal scanners, voice recognition, or other biometric identifiers, RFID readers, card readers, proximity triggers, or other identification or authorization devices. Other methods of authorization may include user-provided patterns, including any combination of numeric or alphanumeric characters, gestures, pictograms, or symbolic inputs.

Figure 4:
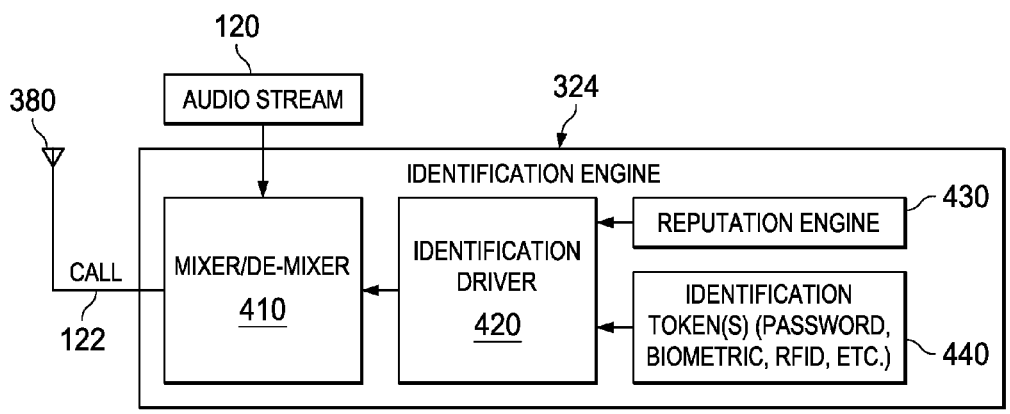
FIG. 4 is a block diagram of an identification engine according to one or more examples of the present Specification.

FIG. 4 is a block diagram of identification engine 324. As noted above, identification engine 324 may be any suitable combination of hardware, software, and/or firmware necessary to carry out the functions of identification engine 324 as described herein.

In an example, identification engine 324 receives unmixed audio stream 120 from a user 130. Unmixed audio stream 120 may be provided to mixer/demixer 410. In certain embodiments, mixer/demixer 410 may be considered a part of identification engine 324, or may be considered a separate block or device. In some cases, mixer/demixer 410 may include a special integrated circuit providing mixing and remixing operations, including for example modulation and demodulation of carrier frequencies onto unmixed audio stream 120. Mixer/demixer 410 may be implemented in hardware (for example as a set of frequency filters, possibly adjustable), in software (for example applying Fourier transformation to the analog data and extracting selected frequencies) or as any suitable combination of the two.

Identification engine 324 also includes an identification driver 420. Identification driver 420 may be a software module, or may include special hardware, such as an integrated circuit programmed to carry out the functions of identification driver 420. In an example, identification driver 420 provides any conditioning, formatting, encrypting, or other modification of identification tokens 440 necessary to provide a usable output for mixing in mixer/demixer 410.

Inputs into identification driver 420 include a reputation engine 430, and identification tokens 440. Identification tokens 440 may include such information as a username, password, RSA key, RFID token, pre-shared key, decryption key, biometric identification, electronic identification signal, ID card reader, or any other suitable identification token.

Reputation engine 430 may be provided to assign a reputation to user 130 based on identification tokens 440. In one example, a user's reputation is a whitelist/blacklist scheme, in which a user is either fully authorized or not-at-all authorized. In other examples, a more nuanced approach may be taken. For example, user 130 may be a computing device or other network element, and reputation engine 430 may provide a network reputation based on user 130's history on the network. In another example, reputation engine 430 includes a graphical user interface (GUI) that interactively communicates with a user 130 to determine what level of trust or access to resources to assign to another user 130. Note that in the example of communication network 100 of FIG. 1, such interaction may take place on either or both ends of network 170. MCD 110-1 may for example query a reputation database and embed reputation data in mixed stream 122-1, or MCD 110-2 may query the reputation database to assign an authorization level to user 130-1. In cases where reputation engine 430 takes substantive action on the sending end of network 170, parts of reputation engine 430 may be provided in secure or tamper-resistant hardware, or in a secure zone of memory such as an Intel® SGX enclave.

The output of reputation engine 430 is a reputation token, which may be provided to identification driver 420, so that identification driver can create appropriate credentials for user 130 and/or MCD 110, or take other appropriate action.

In other cases, a reputation token is provided directly to a user 130, such as through a peripheral connected to peripheral interface 350 of FIG. 3, in which case user 130 may be responsible for taking an appropriate action, or instructing MCD 110 to do so. In cases where a reputation token is provided to identification driver 420, identification driver 420 may provide appropriate credentials to mixer/demixer 410, which imposes a data signal onto audio stream 120, and provides mixed audio stream 122 via wireless network interface 380. The identification token may be visualized as a photo (or any combination of the photo, name, icon or alias) for the benefit of the other parties.

Figure 5:
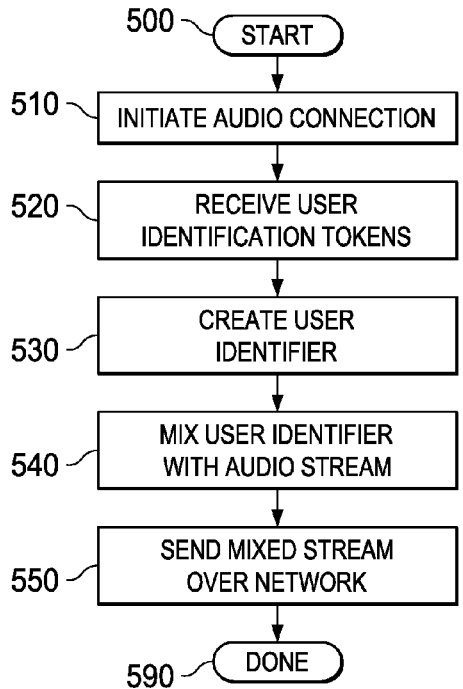
FIG. 5 is a flow diagram of a method according to one or more examples of the present Specification.

FIG. 5 is a flow diagram of a method 500 for user identification according to one or more examples of the present Specification. A first/sending MCD 110-1 and second/receiving MCD 110-2 are used by way of example, as illustrated in FIG. 1.

In block 510, MCD 110-1 initiates an audio connection to MCD 110-2 over network 170. This may be or include, for example unmixed audio stream 120-1. The purpose of the audio connection may be such that it is desirable to identify user 130-1 as an authorized participant in the audio connection. For example, user 130-1 may be calling his bank or some other institution with an interest in identifying him, may be a participant in a conference call with restricted attendance, may be requesting a media stream, or user 130-2 may simply wish to screen incoming calls. These are provided by way of non-limiting example only, and many other applications for a user identification and authorization method will be apparent to practitioners in the art implementing the teachings of this Specification.

In block 520, MCD 110-1 receives one or more user identification tokens from user 130-1. These may be any of the tokens discussed according to this Specification, or any other suitable tokens.

In block 530, MCD 110-1 creates one or more user identifiers that identify user 130-1. This may include, for example, creating a hash of the user identification tokens, providing the user identification tokens as a string, encrypting the user identification tokens for transmittal over network 170, or any other conditioning or formatting of user identification tokens necessary. This token may include the user biometric data (photo obtained via camera, fingerprint, etc. which may be included in plaintext or in any suitable digested form) and/or device identification data (any GUID, UDID, ODIN, IMEI, IMSI, CPUID, etc.). This may also include, in appropriate examples, querying a reputation engine 430 to provide a suitable reputation token. The result of block 530 is, in certain embodiments, a digital data containing identification credentials suitable for use as an identifier by MCD 110-2. Many identification mechanisms are known in the art, and it is not intended to restrict this Specification to simply one or a few such mechanisms.

In block 540, mixer/demixer 410 of identification engine 324 mixes the user identifier created in block 530 in with unmixed audio stream 120-1. This creates mixed stream 122-1.

In block 550, MCD 110-1 sends mixed stream 122-1 over network 170.

According to certain embodiments of the present Specification, at this point MCD 110-1 has completed the necessary tasks for providing identification, and need not take any further action. Rather, the MCD 110-2 may take any further actions necessary. However, in other embodiments, if MCD 110-2 has questions about the authenticity of MCD 110-1, MCD 110-2 may provide an additional query to MCD 110-1. This may help to ensure that user 130 is not inappropriately deemed as inauthentic. Whether or not to provide such a follow-up will depend on the specific application and context. In other cases, MCD 110-1 may further perform method 700 of FIG. 7 or method 800 of FIG. 8 to identify MCD 110-2. In another embodiment the identification is performed repeatedly or periodically (set off by a timer or any event like long silence or suspicious sounds) to ensure that the correct call parties are still present.

In block 590, the method is done.

Figure 6:
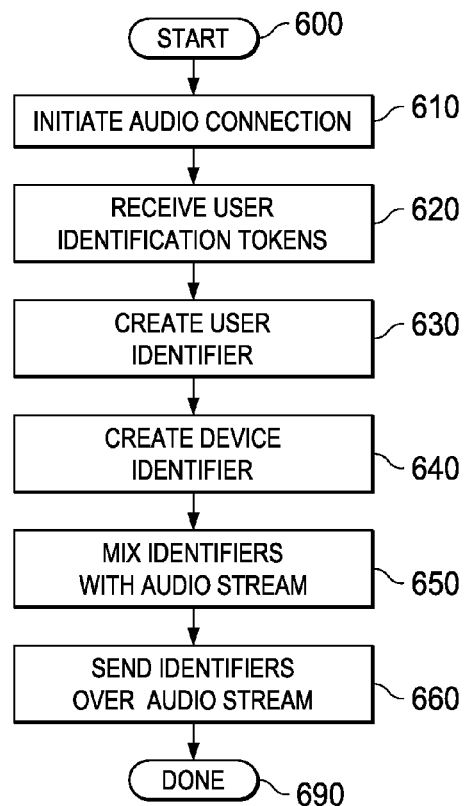
FIG. 6 is a flow diagram of a method according to one or more examples of the present Specification.

FIG. 6 is a flow diagram of a method 600 of user identification according to one or more examples of the present Specification. A first/sending MCD 110-1 and second/receiving MCD 110-2 are used by way of example, as illustrated in FIG. 1.

In block 610, MCD 110-1 initiates an audio connection to MCD 110-2 over network 170. This may be or include, for example unmixed audio stream 120. The purpose of the audio connection may be such that it is desirable to identify user 130-1 as an authorized participant in the audio connection. For example, user 130-1 may be calling his bank or some other institution with an interest in identifying him, may be a participant in a conference call with restricted attendance, may be requesting a media stream, or user 130-2 may simply wish to screen incoming calls. These are provided by way of non-limiting example only, and many other applications for a user identification and authorization method will be apparent to practitioners in the art implementing the teachings of this Specification.

In block 620, MCD 110-1 receives one or more user identification tokens from user 130-1. These may be any of the tokens discussed according to this Specification, or any other suitable tokens.

In block 630, MCD 110-1 creates one or more user identifiers that identify user 130. These blocks 620 and 630 are optional in certain embodiments. In one example, if they are omitted, then the method provides identification of only the device rather than the user/device pair.

In block 640, MCD 110-1 creates a device identifier for itself, which may be based in appropriate examples on a globally-unique identifier (GUID, UDID, ODIN, IMEI, IMSI, CPUID, etc), MAC address, IP address, or other appropriate identifier. This may include, for example, creating a hash of the tokens of blocks 630 and/or 640, providing the identification tokens as a string, encrypting the identification tokens for transmittal over network 170, or any other conditioning or formatting of identification tokens necessary. This may also include, in appropriate examples, querying a reputation engine 430 to provide a suitable reputation token for one or both of user 130-1 and MCD 110-1. The result of blocks 630 and 640 include, in certain embodiments, a digital data transmission containing identification credentials suitable for use as an identifier by MCD 110-2. Many identification mechanisms are known in the art, and it is not intended to restrict this Specification to simply one or a few such mechanisms.

In block 650, mixer/demixer 410 of identification engine 324 mixes the identifiers created in blocks 630 and 640 in with unmixed audio stream 120. This creates mixed stream 122.

In block 660, MCD 110 sends mixed stream 122 over network 170.

According to certain embodiments of the present Specification, at this point MCD 110-1 has completed the necessary tasks for providing identification, and need not take any further action. Rather, the MCD 110-2 may take any further actions necessary. However, in other embodiments, if MCD 110-2 has questions about the authenticity of MCD 110-1, MCD 110-2 may provide an additional query to MCD 110-1. This may help to ensure that user 130 is not inappropriately deemed as inauthentic. Whether or not to provide such a follow-up will depend on the specific application and context. In other cases, MCD 110-1 may further perform method 700 of FIG. 7 or method 800 of FIG. 8 to identify MCD 110-2.

In block 690, the method is done.

Figure 7:
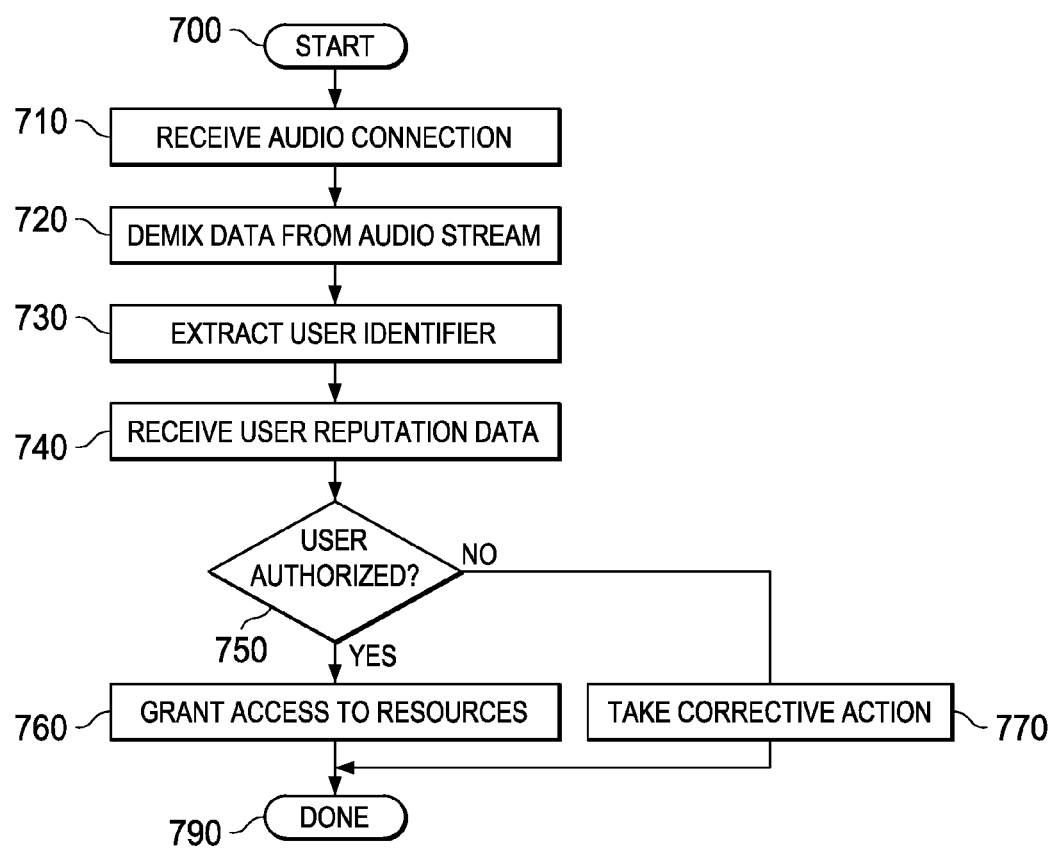
FIG. 7 is a flow diagram of a method according to one or more examples of the present Specification.

FIG. 7 is a block diagram of a method 700 according to one or more examples of this Specification. By way of example, MCD 110-2 is used as the receiving device and MCD 110-1 is used as the sending device. It should be noted, however, that any of the MCDs disclosed in this Specification could perform either role in various embodiments.

In block 710, MCD 110-2 receives an audio connection from MCD 110-1. The audio connection includes mixed stream 122-1 (which may be transmitted a while after the connection is established). The purpose of the audio connection may be such that it is desirable to identify user 130-1 as an authorized participant in the audio connection. For example, user 130-1 may be calling his bank or some other institution with an interest in identifying him, may be a participant in a conference call with restricted attendance, may be requesting a media stream, or user 130-2 may simply wish to screen incoming calls. These are provided by way of non-limiting example only, and many other applications in which a user identification and authorization method are desirable will be apparent to practitioners in the art implementing the teachings of this Specification.

In block 720, mixer/demixer 410 of identification engine 324 demixes digital data from mixed stream 122-1. This yields to MCD 110-2 a digital data stream which may comprise identification credentials or tokens for identifying user 130-1 and assigning him a reputation for authorization purposes.

In block 730, MCD 110-2 extracts from the digital data stream a user credential identifying user 130-1.

In block 740, MCD 110-2 receives a user reputation for user 130-1. This may comprise, for example, reputation engine 430 providing to identification driver 420 reputation data associated with user 130-1. Reputation data may include, in various embodiments, a hash of identification tokens 440 that user 130-1 provided to MCD 110-1. It may include actual biometric data. In other cases, a reputation may comprise other means of comparing identification data received from MCD 110-1 to a reputation for user 130-1. In some cases, identification may be a Boolean operation, wherein user 130-1 is deemed either authorized or not authorized. In other examples, fuzzy logic may be used to provide a reputation for user 130-1. For example, if user 130-1 is a device rather than a human user, then user 130-1 may have a network reputation. In other cases, user 130-2 may treat user 130-1 with increased wariness or vigilance based on past performance. In yet other cases, heuristic algorithms may be used to determine a reputation for user 130-1.

In block 750, MCD 110-2 (possibly with feedback or input from user 130-2) determines whether user 130-1 is authorized to access resources.

In block 760, if user 130-1 is authorized, then MCD 110-2 grants to user 130-1 access to resources commensurate with user 130-1's access rights.

In block 770, if user 130-1 is not authorized, then MCD 110-2 and/or user 130-2 may take corrective action according to the methods disclosed in the Specification.

In block 790, the method is done.

Figure 8:
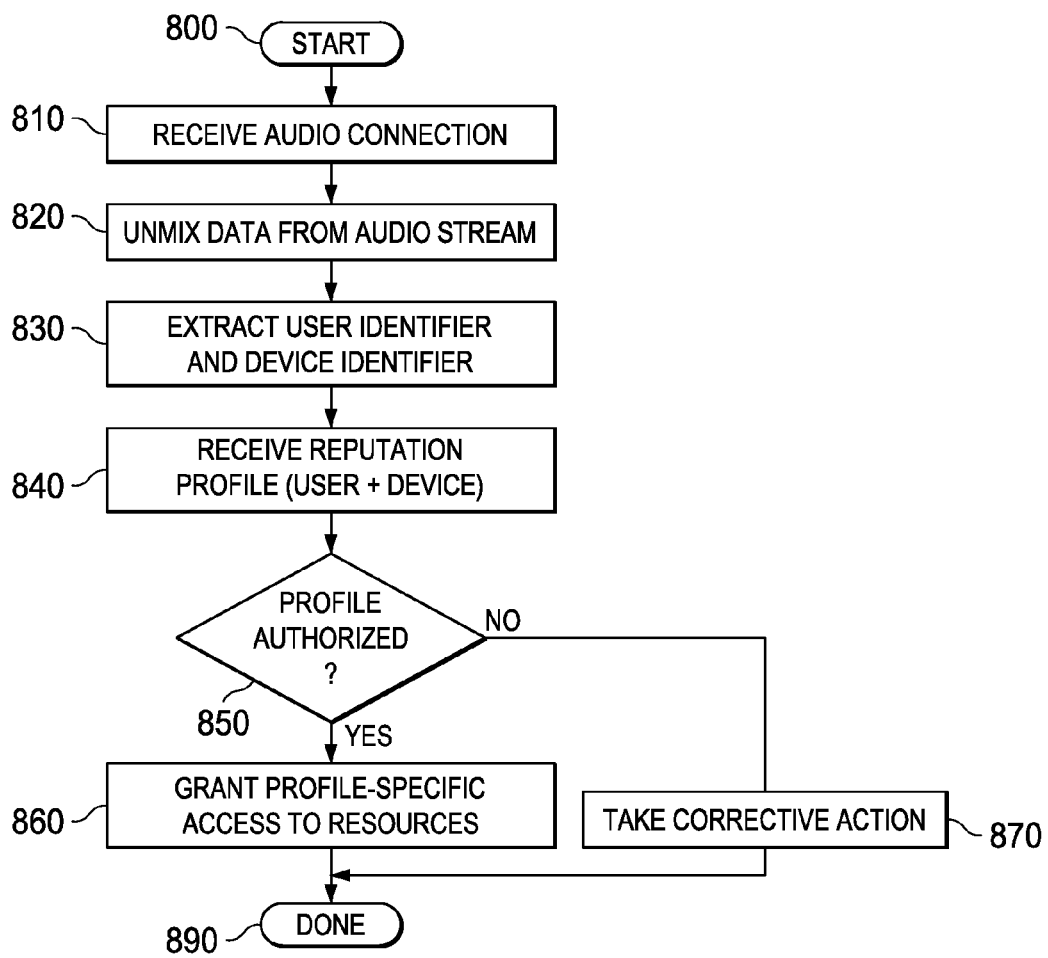
FIG. 8 is a flow diagram of a method according to one or more examples of the present Specification.

FIG. 8 is a block diagram of a method 800 according to one or more examples of this Specification. By way of example, MCD 110-2 is used as the receiving device and MCD 110-1 is used as the sending device. It should be noted, however, that any of the MCDs disclosed in this Specification could perform either role in various embodiments.

In block 810, MCD 110-2 receives an audio connection from MCD 110-1. The audio connection includes mixed stream 122-1. The purpose of the audio connection may be such that it is desirable to identify user 130-1 as an authorized participant in the audio connection. For example, user 130-1 may be calling his bank or some other institution with an interest in identifying him, may be a participant in a conference call with restricted attendance, may be requesting a media stream, or user 130-2 may simply wish to screen incoming calls. These are provided by way of non-limiting example only, and many other applications in which a user identification and authorization method are desirable will be apparent to practitioners in the art implementing the teachings of this Specification.

In block 820, mixer/demixer 410 of identification engine 324 demixes digital data from mixed stream 122-1. This yields to MCD 110-2 a digital data stream, which may comprise identification, credentials or tokens for identifying user 130-1, and/or MCD 110-1 and assigning one or both a reputation for authorization purposes.

In block 830, MCD 110-2 extracts from the digital data stream credentials for identifying one or both of user 130-1 and MCD 110-1.

In block 840, MCD 110-2 receives a reputation profile for one or both of user 130-1 and MCD 110-1, or for a combination of the two. This may comprise, for example, reputation engine 430 providing to identification driver 420 reputation data associated with user 130-1 and/or MCD 110-1. Reputation data may include, in various embodiments, a hash of identification tokens 440. In other cases, a reputation may comprise other means of comparing identification data to a reputation for user 130-1 and/or MCD 110-1. In some cases, identification may be a Boolean operation, wherein user 130-1 is deemed either authorized or not authorized to access resources via MCD 110-1. In other examples, fuzzy logic may be used to provide a combined reputation score. For example, one or both of user 130-1 and MCD 110-1 may have a network reputation. In other cases, user 130-2 may treat user 130-1 with increased wariness or vigilance based on past performance, or on which MCD 110 user 130-1 is operating. For example, user 130-1 may be granted greater trust if he is operating MCD provided by an enterprise or that has otherwise been verified as trustworthy. If user 130-1 is using some other device, he may be deemed less trustworthy. In yet other cases, heuristic algorithms may be used to determine a reputation for user 130-1 and MCD 110-1.

In block 850, MCD 110-2 (possibly with feedback or input from user 130-2) determines whether user 130-1 is authorized to access resources.

In block 860, if user 130-1 and MCD 110-1 are authorized, then MCD 110-2 grants access to resources, which may be specific to the profile provided by the combination of user 130-1 and MCD 110-1.

In block 870, if user 130-1 or MCD 110-1 is not authorized, then MCD 110-2 and/or user 130-2 may take corrective action according to the methods disclosed in the Specification.

In block 890, the method is done.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offers an equally viable option for implementing the teachings of the present disclosure.

In one embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the Specification, to limit this disclosure in any way that is not otherwise reflected in the appended claims.

Other Notes and Examples

There is disclosed in example 1, an apparatus, comprising:
    an audio telecommunication driver;
    a mixer/demixer operable to mix digital data into an audio stream of the audio telecommunication driver, and to demix digital data from the audio stream; and
    an identification engine operable to receive an identification credential of one or more remote users from the mixer/de-mixer, and authorize the remote user as a participant in the audio stream.

There is disclosed in example 2, the apparatus of example 1, wherein the audio stream is a voice call.

There is disclosed in example 3, the apparatus of example 1, wherein the identification engine is further operable to:
    identify a local user; and
    send a user identification credential of the local user to the mixer/demixer for insertion into the audio stream.

There is disclosed in example 4, the apparatus of example 3, wherein identifying the local user comprises receiving a token selected from the group consisting of a username, password, pattern, and biometric feature.

There is disclosed in example 5, the apparatus of example 3, wherein the identification engine is further operable to send a device identification credential.

There is disclosed in example 6, the apparatus of example 1, wherein the identification engine is further operable to receive an identification credential of a remote device and authorize the remote device as a participant in the audio stream.

There is disclosed in example 7, the apparatus of example 1, wherein identifying the remote user comprises exchanging a pre-shared secret.

There is disclosed in example 8, the apparatus of example 1, wherein identifying the remote user comprises assigning the remote user a reputation.

There is disclosed in example 9, the apparatus of example 1, wherein the identification engine is further operable to:
    determine that the remote user is not authorized as a participant in the audio stream; and
    act on the determination.

There is disclosed in example 10, the apparatus of example 9, wherein acting on the determination comprises dropping the audio stream.

There is disclosed in example 11, the apparatus of example 9, wherein acting on the determination comprises degrading the quality of the audio stream.

There is disclosed in example 12, the apparatus of example 9, wherein acting on the determination comprises providing a notification that the remote user is not authorized.

There is disclosed in example 13, the apparatus of example 1, wherein the identification engine is further operable to re-authorize the remote user as a participant in the audio stream periodically or in response to a stimulus.

There is disclosed in example 14, one or more computer-readable mediums having stored thereon instructions operable to instruct a processor to:
    demix an identification of a remote user from digital data encoded in an audio stream; and
    authorize the remote user as a participant in the audio stream.

There is disclosed in example 15, the one or more mediums of example 14, wherein the audio stream is a voice call.

There is disclosed in example 16, the one or more mediums of example 14, wherein the logic is further operable to instruct the processor to:
    identify a local user; and
    mix a user identification of the local user into the audio stream.

There is disclosed in example 17, the one or more mediums of example 16, wherein identifying the local user comprises a method selected from the group consisting of receiving a password, receiving a username and password, receiving a pre-shared secret, receiving multi-factor identification, receiving a biometric identification, and receiving an electronic identification signal.

There is disclosed in example 18, the one or more mediums of example 14, wherein identifying the remote user comprises assigning the remote user a reputation.

There is disclosed in example 19, the one or more mediums of example 14, further operable to instruct the processor to:
    determine that the remote user is not authorized as a participant in the audio stream; and
    act on the determination.

There is disclosed in example 20, the one or more mediums of example 19, wherein acting on the determination comprises dropping the audio stream.

There is disclosed in example 21, the one or more mediums of example 19, wherein acting on the determination comprises degrading the quality of the audio stream.

There is disclosed in example 22, the one or more mediums of example 21, wherein degrading the quality of the audio stream comprises lossily compressing the audio stream.

There is disclosed in example 23, the one or more mediums of example 19, wherein acting on the determination comprises providing a notification that the remote user is not authorized.

There is disclosed in example 24, a method comprising:
demixing an identification of a remote user from digital data encoded in an audio stream; and
authorizing the remote user as a participant in the audio stream.

There is disclosed in example 25, the method of example 24, further comprising:
identifying a local user; and
mixing an identification of the local user into the audio stream.

There is disclosed in example 26, an apparatus comprising means for performing the method of example 24 or 25.

There is disclosed in example 27, the apparatus of claim 26, wherein the means comprise a processor and a memory.

What is claimed is:

1. An apparatus, comprising:
an audio telecommunication driver providing an audio stream;
a mixer/demixer operable to demix digital authentication data from the audio stream; and
an identification engine operable to receive an identification credential of one or more remote users via the digital authentication data, authorize the one or more remote users as a participant in the audio stream, and re-authorize the remote user as a participant in the audio stream periodically or in response to a stimulus.

2. The apparatus of claim 1, wherein the audio stream is a voice call.

3. The apparatus of claim 1, wherein the identification engine is further operable to:
identify a local user; and
send a user identification credential of the local user to the mixer/demixer for insertion into the audio stream;
wherein the mixer/demixer is further operable to mix the user identification data into the audio stream as digital authentication data.

4. The apparatus of claim 3, wherein identifying the local user comprises receiving a token selected from the group consisting of a username, password, pattern, and biometric feature.

5. The apparatus of claim 3, wherein the identification engine is further operable to send a device identification credential.

6. The apparatus of claim 1, wherein the identification engine is further operable to receive an identification credential of a remote device and authorize the remote device as a participant in the audio stream.

7. The apparatus of claim 1, wherein identifying the remote user comprises exchanging a pre-shared secret.

8. The apparatus of claim 1, wherein identifying the remote user comprises assigning the remote user a reputation.

9. The apparatus of claim 1, wherein the identification engine is further operable to:
determine that the remote user is not authorized as a participant in the audio stream; and
act on the determination.

10. The apparatus of claim 9, wherein acting on the determination comprises dropping the audio stream.

11. The apparatus of claim 9, wherein acting on the determination comprises degrading the quality of the audio stream.

12. The apparatus of claim 9, wherein acting on the determination comprises providing a notification that the remote user is not authorized.

13. One or more computer-readable mediums having stored thereon instructions operable to instruct a processor to:
demix digital authentication data of a remote user from digital data encoded in an audio stream;
authorize the remote user as a participant in the audio stream; and
re-authorize the remote user as a participant in the audio stream periodically or in response to a stimulus.

14. The one or more mediums of claim 13, wherein the audio stream is a voice call.

15. The one or more mediums of claim 13, wherein the instructions are further operable to instruct the processor to:
identify a local user; and
mix a user identification of the local user into the audio stream as digital authentication data.

16. The one or more mediums of claim 15, wherein identifying the local user comprises a method selected from the group consisting of receiving a password, receiving a username and password, receiving a pre-shared secret, receiving multi-factor identification, receiving a biometric identification, and receiving an electronic identification signal.

17. The one or more mediums of claim 13, wherein identifying the remote user comprises assigning the remote user a reputation.

18. The one or more mediums of claim 13, further operable to instruct the processor to:
determine that the remote user is not authorized as a participant in the audio stream; and
act on the determination.

19. The one or more mediums of claim 18, wherein acting on the determination comprises dropping the audio stream.

20. The one or more mediums of claim 18, wherein acting on the determination comprises degrading the quality of the audio stream.

21. The one or more mediums of claim 20, wherein degrading the quality of the audio stream comprises lossily compressing the audio stream.

22. The one or more mediums of claim 18, wherein acting on the determination comprises providing a notification that the remote user is not authorized.

23. A method comprising:
demixing digital authentication data of a remote user from digital data encoded in an audio stream;
authorizing the remote user as a participant in the audio stream; and
re-authorizing the remote user as a participant in the audio stream periodically or in response to a stimulus.

24. The method of claim 23, further comprising:
identifying a local user; and
mixing an identification of the local user into the audio stream as digital authentication data.

* * * * *